(12) United States Patent
Deng et al.

(10) Patent No.: US 8,078,373 B2
(45) Date of Patent: Dec. 13, 2011

(54) VEHICLE DYNAMICS PREDICTION WITH LANE/PATH INFORMATION USING A PREVIEW-CORRECTION-PREDICTION APPROACH

(75) Inventors: Weiwen Deng, Rochester Hills, MI (US); Yong H. Lee, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 562 days.

(21) Appl. No.: 12/275,978

(22) Filed: Nov. 21, 2008

(65) Prior Publication Data
US 2010/0131142 A1    May 27, 2010

(51) Int. Cl.
*G06F 17/00* (2006.01)
(52) U.S. Cl. ............. 701/65; 701/1; 701/36; 701/37; 701/41; 701/45; 180/197; 180/247; 180/248; 180/421; 180/422; 703/1; 703/2; 703/7; 703/8; 477/145; 477/155; 340/934; 280/162
(58) Field of Classification Search .......... 701/1, 36, 701/37, 41, 45, 48, 51, 78, 207, 117, 118, 701/119, 215; 180/197, 247, 248, 421, 422, 180/446; 73/146, 178 R, 669; 703/1, 2, 703/7, 8; 477/145, 155; 340/934; 280/5.51; 303/162
See application file for complete search history.

(56) References Cited

U.S. PATENT DOCUMENTS

| | | | | | |
|---|---|---|---|---|---|
| 5,335,180 | A * | 8/1994 | Takahashi et al. | ............. | 701/117 |
| 6,954,691 | B2 * | 10/2005 | Roll et al. | ............. | 701/70 |
| 7,010,409 | B2 * | 3/2006 | Lu et al. | ............. | 701/70 |
| 7,092,808 | B2 * | 8/2006 | Lu et al. | ............. | 701/70 |
| 7,239,949 | B2 * | 7/2007 | Lu et al. | ............. | 701/45 |
| 7,630,805 | B2 * | 12/2009 | Lu et al. | ............. | 701/45 |
| 7,650,215 | B2 * | 1/2010 | Lu et al. | ............. | 701/70 |
| 2009/0054075 | A1 * | 2/2009 | Boejer et al. | ............. | 455/456.1 |

* cited by examiner

*Primary Examiner* — James Trammell
*Assistant Examiner* — McDieunel Marc
(74) *Attorney, Agent, or Firm* — John A. Miller; Miller IP Group, PLC

(57) ABSTRACT

A method for predicting the dynamics of a vehicle using information about the path on which the vehicle is travelling that has particular application for enhancing active safety performance of the vehicle, to improve driver comfort and to improve vehicle dynamics control. The method includes generating a preview of a path to be followed by the vehicle where the preview of the path is generated based on actual values of a plurality of vehicle parameters. The method further includes obtaining a corrected value of at least one of the plurality of vehicle parameters corresponding to the actual values of each of the plurality of vehicle parameters, wherein the corrected value of the at least one of the vehicle parameters is obtained based on a target path to be followed by the vehicle on the road, and wherein the target path is obtained on the basis of a plurality of road parameters.

20 Claims, 5 Drawing Sheets

… (US 8,078,373 B2)

VEHICLE DYNAMICS PREDICTION WITH LANE/PATH INFORMATION USING A PREVIEW-CORRECTION-PREDICTION APPROACH

BACKGROUND OF THE INVENTION

1. Field of the Invention

This invention relates generally to the prediction of dynamics of a vehicle and, more particularly, to a recursive method for predicting vehicle dynamics using information about a path on which the vehicle is travelling for enhancing active safety performance of the vehicle and to improve driver comfort.

2. Description of the Related Art

Most modern vehicles are equipped with vehicle control (VC) systems that enhance the safety and comfort of the occupants of the vehicle. VC systems constantly monitor and control, if required, various vehicle parameters, such as yaw, side-slip and roll of the vehicle. In general, sensors are used to monitor vehicle parameters, such as those mentioned above, along with certain driver inputs, such as rotation of the steering wheel and brake and throttle applications. VC systems receive signals from these sensors and keep the vehicle stable and under control by taking certain actions.

It can be said that the VC systems currently found in the art are largely feedback based. The feedback mechanism of such systems sometimes makes them slow to respond in real time situations. In other situations, a quick and aggressive control action taken by the VC system in response to signals from the sensors can lead to discomfort of the driver and other occupants, and also to the vehicle going out of control. Keeping in mind the above-mentioned concerns, VC systems can be made more effective by incorporating early prediction of dynamic states of the vehicle, such as vehicle spinning and rollover.

One existing method for predicting the dynamics of a vehicle only makes use of the conventional on-board vehicle sensors, such as vehicle speed sensors, lateral and longitudinal acceleration sensors, steering angle sensors and yaw-rate sensors, to make the predictions. However, the inability of a technique to base this prediction on other sensor inputs, such as lane/path from vision and GPS/map database, compromises the system's ability and results in an unreliable prediction.

Another known method for predicting the dynamics of a vehicle makes use of a mathematical model. However, this method assumes the steering angle to be constant for a pre-determined time period in the future, which is seldom the case. Further, the method does not take into account the corrections made by the driver and different driving styles.

Another known method for predicting and compensating the dynamics of a vehicle makes use of the transmission of information between two vehicles. Vehicle control systems base their response on information received from a vehicle travelling just ahead of the concerned vehicle. However, this method may not be practical for predicting vehicle dynamics due to its naturally small bandwidth and slow response compared to fast vehicle dynamics.

SUMMARY OF THE INVENTION

In accordance with the teachings of the present invention, a recursive method for predicting the dynamics of a vehicle using information about the path on which the vehicle is travelling is disclosed that has particular application in enhancing active safety performance of the vehicle, improving driver comfort and improving vehicle dynamics control. The method includes generating a preview of a path to be followed by the vehicle, where the preview of the path is generated based on actual values of a plurality of vehicle parameters. The method further includes obtaining a corrected value of at least one of the plurality of vehicle parameters corresponding to the actual values of each of the vehicle parameters, where the corrected value is obtained based on a target path to be followed by the vehicle on the road, where the target path is obtained based on a plurality of road parameters. Further, the dynamic state of the vehicle is predicted based on the corrected value, and the steps for generating the preview of the path, obtaining the corrected value and predicting the dynamic state of the vehicle are repeated after a pre-determined time interval with the actual values of the vehicle parameters being replaced by the corrected values.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for predicting dynamics of a vehicle moving on a road is merely exemplary in nature, and is in no way intended to limit the invention or its applications or uses. For example, the method has specific application in enhancing active safety performance of a vehicle having predictive vehicle controls, such as curve speed control, adaptive cruise control, lane keeping and lane changing/centering controls. However, as will be appreciated by those skilled in the art, the method for predicting the dynamics of a vehicle moving on a road may have other applications.

Figure 1:
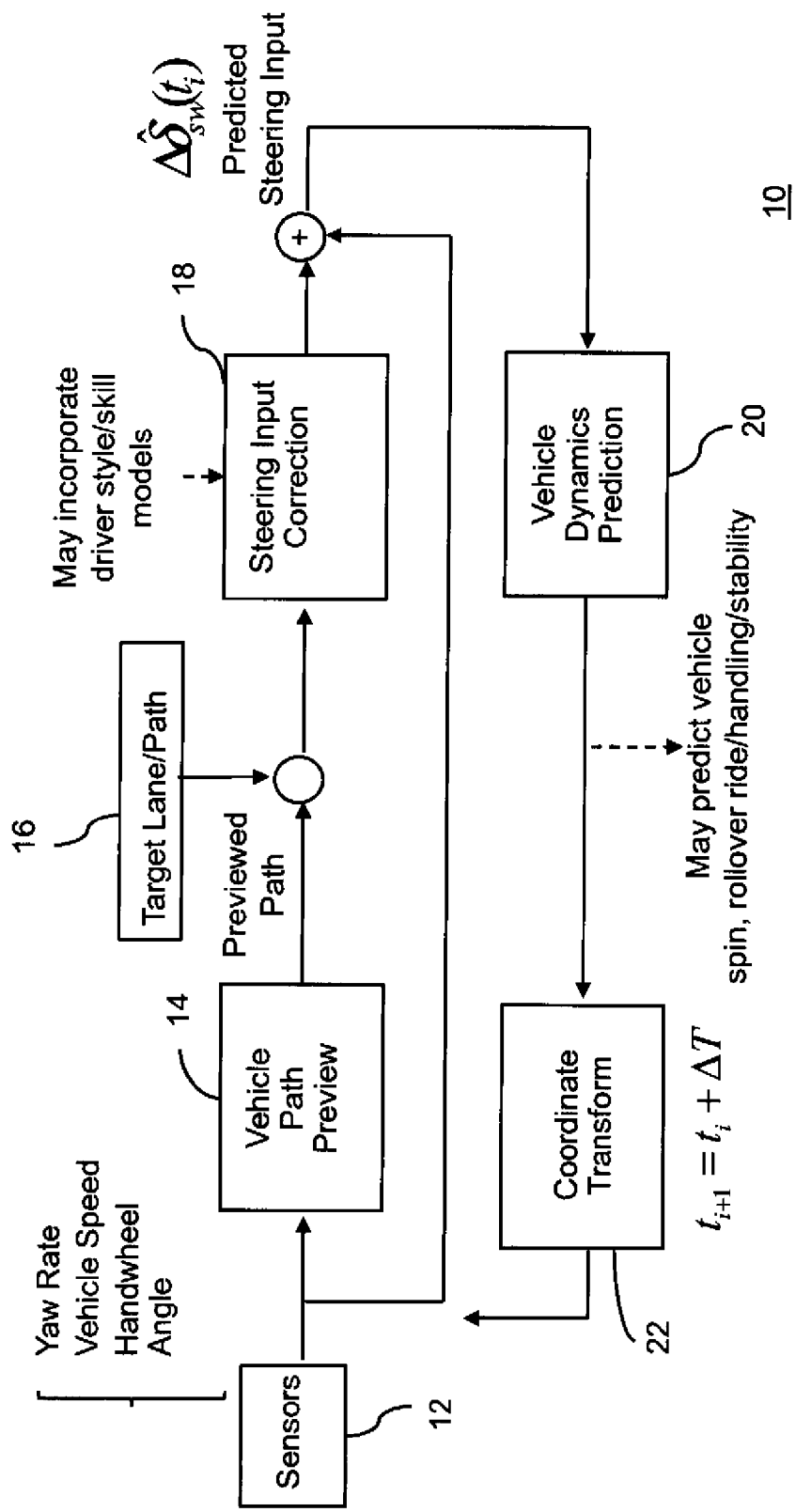
FIG. 1 is a block diagram illustrating a recursive method for predicting dynamics of a vehicle moving on a road.

FIG. 1 is a block diagram illustrating a recursive system 10 for predicting dynamics of a vehicle moving on a road or a preview-correction-prediction method, hereinafter used interchangeably, using a recursive process. At block 12, various sensors known in the art are used to obtain vehicle parameters, such as vehicle yaw rate, vehicle speed and hand-wheel angle. Some of these parameters form a part of the vehicle state parameters which together constitute the dynamics of the vehicle. The hand-wheel angle is the angle that the steering wheel of the vehicle is rotated to make a vehicle turn. At block 14, a preview of the path that the vehicle is going to follow is generated by estimating the vehicle dynamics based on the values of the vehicle yaw rate, vehicle speed and hand-wheel angle obtained from the sensors at the block 12. However, it will be readily apparent to any person of ordinary skill in the art that the preview of the path that the vehicle is going to follow can be generated using parameters other than vehicle yaw rate, vehicle speed and hand-wheel angle, and the sensors at the block 12 can be used to obtain these parameters. One method for obtaining a preview of the vehicle path is described below.

At block 16, a target path to be followed by the vehicle is obtained. The target path is the ideal or the best possible path or lane that the vehicle can take on the road and is determined based on signals received from equipment that provides information about road parameters, such as a camera, a global positioning system (GPS) and/or a database of digital maps. At block 18, a steering input correction is estimated, which is the difference between the steering input or the hand-wheel angle as obtained at block 12 and a future steering input that should be given to the vehicle so that it follows the target path. Prediction of the future steering input is provided by minimizing the deviation between the previewed path and the target path. In one embodiment, the minimization of deviation between the previewed path and the target path is provided using an optimal control approach, as will be described below. At block 20, the vehicle dynamics are predicted based on the predicted steering input, and the updated vehicle velocity and vehicle yaw rate. The calculations involved at this step are similar to those used at the block 14. The method for predicting the vehicle dynamics, according to one embodiment, will be described below.

It will be readily apparent to a person of ordinary skill in the art that a future value of a parameter other than the steering input can be predicted at the block 18 and in turn can be used for the prediction of vehicle dynamics at the block 20. The above-mentioned steps are repeated for the prediction of the vehicle dynamics after a pre-determined interval of time. The vehicle is virtually moved using coordinate transform at block 22 and a new set of vehicle coordinates is obtained. The target path is now taken with respect to the new vehicle coordinates obtained at the block 22. Further, the predicted values of the vehicle state parameters, obtained during the vehicle dynamics prediction at the block 20, are now initial values used for previewing the path of the vehicle at 14.

Figure 2:
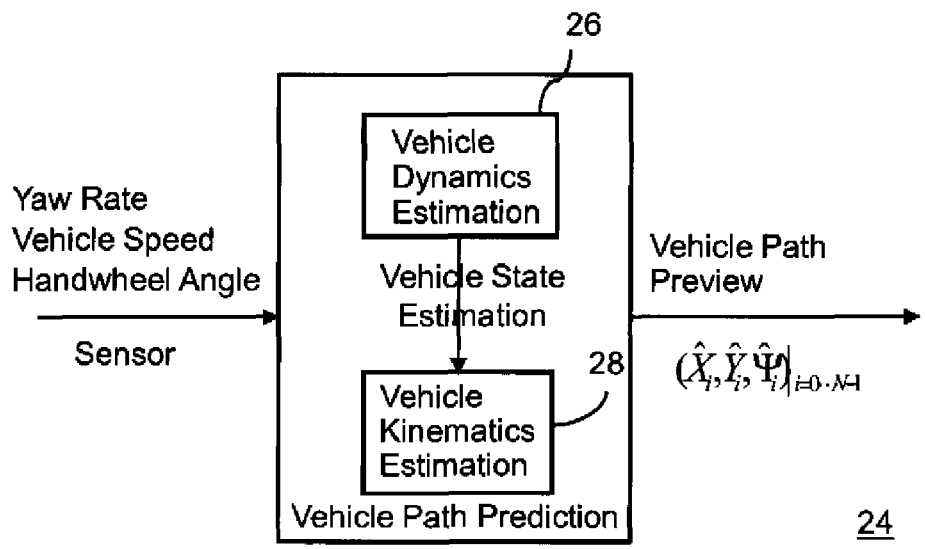
FIG. 2 is a block diagram illustrating a process for generating a preview of a path to be followed by a vehicle on the road.

FIG. 2 is a block diagram 24 illustrating a process for generating a preview of the path to be followed by the vehicle on the road. At block 26, vehicle dynamics estimation takes place. This includes estimation of various vehicle state parameters including the vehicle lateral velocity $\hat{v}_y$ based on the sensor inputs of hand-wheel angle $\delta_{sw}(t_i)$, vehicle yaw rate $r(t_i)$ and vehicle speed $v_x(t_i)$ using, for example, a Luenberger state observer. It will be readily apparent to a person of ordinary skill in the art that a model other than a Luenberger state observer can be used to determine the vehicle state parameters. Estimation of the vehicle state parameters using a Luenberger state observer can be done using equation (1).

$$\begin{bmatrix} \dot{r} \\ \dot{\hat{v}}_y \end{bmatrix} = \begin{bmatrix} -\frac{C_f \cdot a^2 + C_r \cdot b^2}{I_z \cdot u} & \frac{C_r \cdot b - C_f \cdot a}{I_z \cdot u} \\ \frac{C_r \cdot b - C_f \cdot a}{m \cdot u} - u & -\frac{C_f + C_r}{m \cdot u} \end{bmatrix} \cdot \begin{bmatrix} \hat{r} \\ \hat{v}_y \end{bmatrix} + \\ \begin{bmatrix} \frac{C_f \cdot a}{I_z} & -\frac{C_r \cdot b}{I_z} \\ \frac{C_f}{m} & \frac{C_r}{m} \end{bmatrix} \cdot \begin{bmatrix} \delta_f \\ \delta_r \end{bmatrix} + L(\hat{r} - r) \qquad (1)$$

Where a is the distance between the vehicle front axle and the vehicle center of gravity, b is the distance between the vehicle rear axle and the vehicle center of gravity, $C_f$ is the vehicle front tire cornering stiffness, $C_r$ is the vehicle rear tire cornering stiffness, $I_z$ is the vehicle moment of inertia with respect to the center of gravity, L is the feedback gain of the state observer, m is the mass of the vehicle, $\delta_f$ is the vehicle front wheel angle and $\delta_r$ is the vehicle rear wheel angle.

The vehicle state signal from the vehicle dynamics estimation at the block 26 is then sent to block 28 for vehicle kinematics estimation. Vehicle kinematics estimation can be used to predict where the vehicle is heading with respect to a fixed vehicle coordinate system (X, Y). This is done using the following equations.

$$\dot{Y} = v_x \cdot \sin(\hat{\psi}) + \hat{v}_y \cdot \cos(\hat{\psi}) \qquad (2)$$

$$\dot{X} = v_x \cdot \cos(\hat{\psi}) - \hat{v}_y \cdot \sin(\hat{\psi}) \qquad (3)$$

$$[|\$]\$\hat{\ }\$\$[|\$]\$\hat{\ }A\hat{P}[|\$]\$\hat{\ }g\hat{w} = r \qquad (4)$$

Where $\hat{\psi}$ is the yaw angle of the vehicle. Thus, the predicted vehicle trajectory or the previewed path can be calculated as:

$$\hat{X}(t) = \hat{X}(t_0) + \int_{t_0}^{t} \dot{\hat{X}} \cdot dt \approx \hat{X}(t_0) + \Delta \hat{X} \qquad (5)$$

$$\hat{Y}(t) = \hat{Y}(t_0) + \int_{t_0}^{t} \dot{\hat{Y}} \cdot dt \approx \hat{Y}(t_0) + \Delta \hat{Y} \qquad (6)$$

Figure 3:
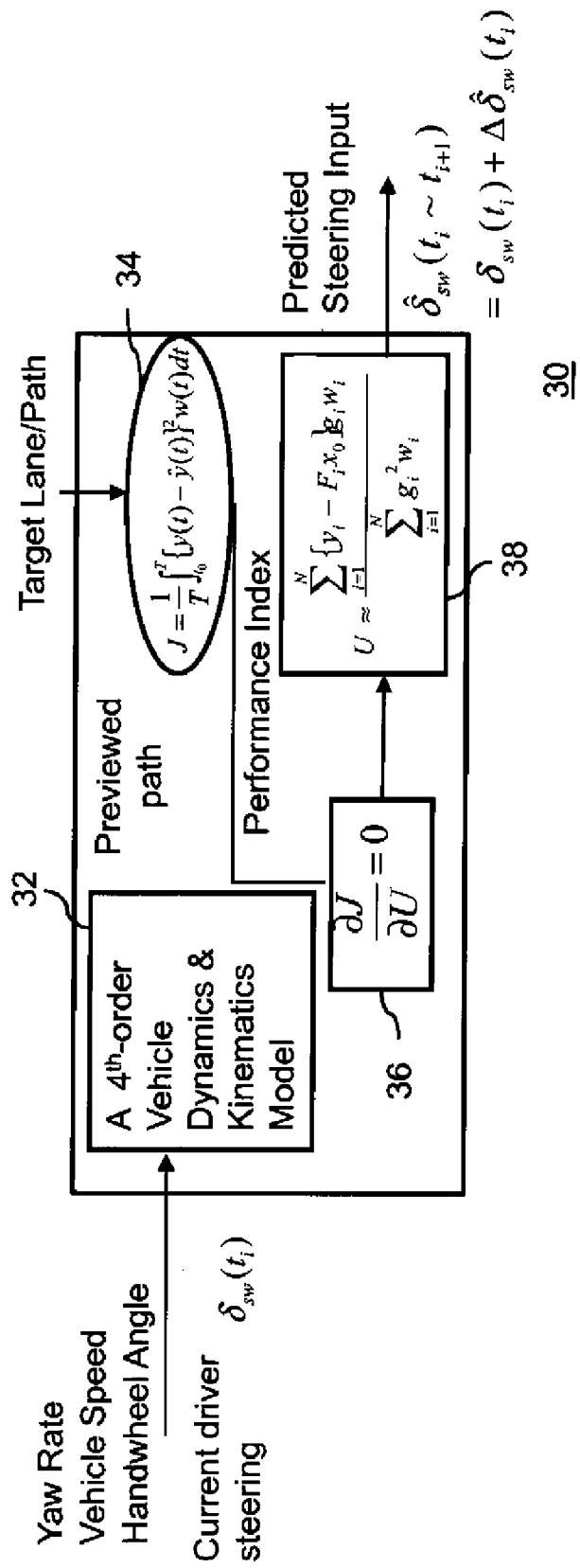
FIG. 3 is a block diagram illustrating a process for obtaining a predicted steering input using an optimal control approach.

FIG. 3 is a block diagram 30 illustrating a process for obtaining a predicted steering input using the optimal control approach. The method uses fourth-order vehicle dynamics and kinematics estimation at block 32. The hand-wheel angle $\delta_{sw}(t_i)$, the vehicle yaw rate $r(t_i)$ and the vehicle speed $v_x(t_i)$ at any time $t_i$ are inputs to block 32 and a previewed vehicle path $\hat{y}(t)$ is received. The previewed vehicle path $\hat{y}(t)$ is given by equation (7).

$$\hat{y}(t) = F(t)\hat{x}_0 + g(t)U \qquad (7)$$

The previewed vehicle path $\hat{y}(t)$ is then sent to block 34 where along with the target path y it is used to generate a cost function J using equation (8).

$$J = \frac{1}{T} \int_0^T \{y(t) - \hat{y}(t)\}^2 w(t) dt \qquad (8)$$

The cost function J represents the deviation between the previewed path $\hat{y}(t)$ and the target path y. Thus, the prediction of the future steering input using the optimal control approach involves minimization of the deviation between the previewed path $\hat{y}(t)$ and the target path, that is, minimizing the cost function J to calculate a steering input correction. Equation (8) is a second order quadratic, thus a partial derivative of the cost function J will go to zero when the cost function J is minimized. The partial derivative of the cost function J is taken at block 36 and an optimal control signal U is used at block 38 as the predicted steering input $\hat{\delta}_{sw}(t_i \sim t_{i+1})$ given by:

$$\hat{\delta}_{sw}(t_i \sim t_{i+1}) = \delta_{sw}(t_i) + \Delta \hat{\delta}_{sw}(t_i) \qquad (9)$$

Where $\hat{\delta}_{sw}(t_i \sim t_{i+1})$ is the predicted steering input between time $t_i$ and $t_{i+1}$, $\delta_{sw}(t_i)$ is the steering input at time $t_i$ and $\Delta \hat{\delta}_{sw}(t_i)$ is the steering input correction at time $t_i$.

The optimal control signal U is given by:

$$U \approx \frac{\sum_{i=1}^{N} \{y_i - F_i x_0\} g_i w_i}{\sum_{i=1}^{N} g_i^2 w_i} \quad (10)$$

Where $F_i$ and $g_i$ are the free-response array and the forced-response array, respectively, and N is the number of sampling points used during the preview time period. The definition of N is given more clearly in FIG. 5 discussed below.

Figure 4:
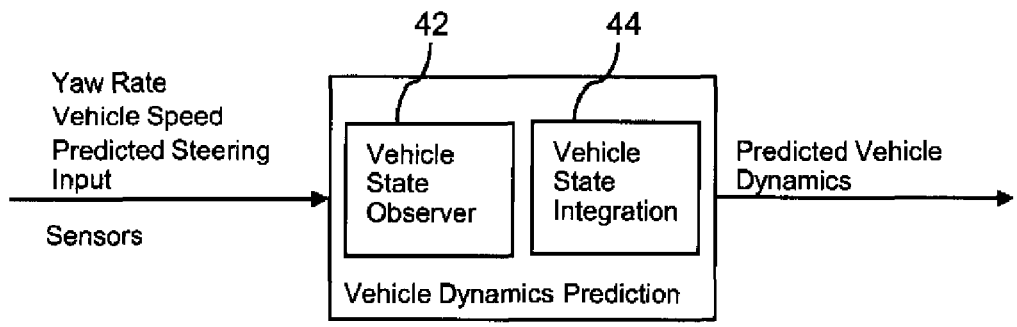
FIG. 4 is a block diagram illustrating a process for vehicle dynamics prediction.

FIG. 4 is a block diagram 40 illustrating a process for vehicle dynamics prediction using predicted steering input, as obtained in FIG. 3, and vehicle speed. The process involves estimating the vehicle state parameters using a Luenberger state observer at block 42 and integrating them with predicted steering input from FIG. 3 and the updated vehicle speed and vehicle yaw rate at that time to obtain the predicted dynamic states of the vehicle at block 44. The calculations involved in this process are similar to those carried out at the block 26, as described in FIG. 2.

Figure 5:
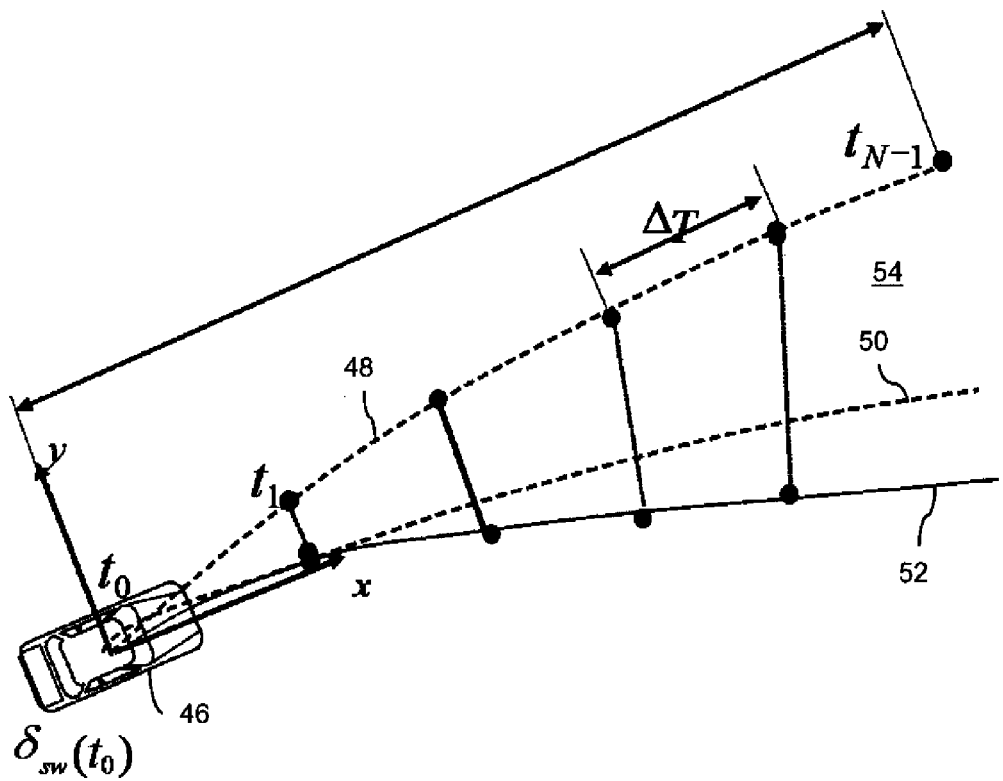
FIG. 5 is an exemplary diagram of a vehicle moving on a road illustrating the manner in which the method for predicting the dynamics of the vehicle is repeated over time.

FIG. 5 is an exemplary diagram of a vehicle 46 moving on a road illustrating the manner in which the preview-correction-prediction method of the invention is repeated over time. Span 54 is said to be the preview distance for which the method for predicting the dynamics of the vehicle is repeated. The preview distance 54 is divided into N sampling segments with each segment separated from the other by a time interval $\Delta T$. Line or path 48 depicts the previewed path of the vehicle at time $t_0$. The previewed path 48 is generated based on the steering input or the hand-wheel angle $\delta_{sw}(t_0)$ at time $t_0$ along with other parameters, such as vehicle velocity and vehicle yaw rate. Line 52 depicts the target path and is obtained as described above for FIG. 1. Line 50 depicts the path that the vehicle will follow once the steering input corrections, which are obtained as discussed above for FIG. 3, are incorporated into the steering of the vehicle so that the vehicle follows a path which is closest to the target path. The preview-correction-prediction method is shown to be performed at every $\Delta T$ time interval while the prediction part of the recursive method takes place in every $\Delta t$ time interval, where $\Delta t$ is less than $\Delta T$.

Figure 6:
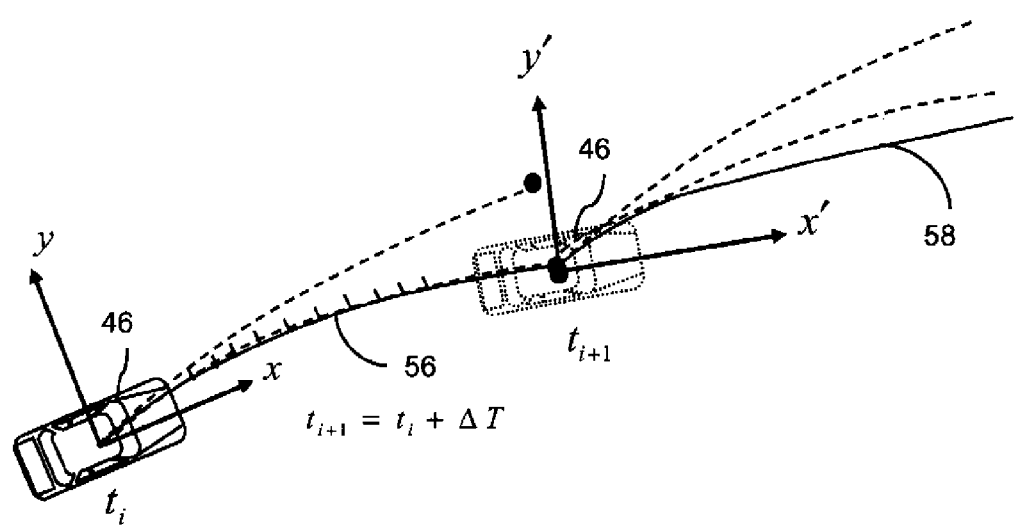
FIG. 6 is an exemplary diagram of a vehicle moving on a road illustrating the manner in which the method for predicting the dynamics of the vehicle is advanced into a next loop.

FIG. 6 is an exemplary diagram of the vehicle 46 moving on a road illustrating the manner in which the preview-correction-prediction method is advanced into the next loop, according to an embodiment. The positions of the vehicle 46 have been depicted in two adjacent loops at times $t_i$ and $t_{i+1}$. The vehicle 46 is shown to have a target path 56 corresponding to its coordinates in a fixed coordinate system (x,y) at time $t_i$ and a target path 58 corresponding to its coordinates in a fixed coordinate system (x',y'). The coordinates of the vehicle 46 in its future position at time $t_{i+1}$ are obtained by applying a coordinate transform to its coordinates at time $t_i$. The coordinate transform is given by equation (11).

$$\begin{bmatrix} \cos\Psi & -\sin\Psi \\ \sin\Psi & \cos\Psi \end{bmatrix}^{-1} \quad (11)$$

Various embodiments of the present invention offer one or more advantages. The method of the present invention provides improved vehicle dynamics control performance by reducing or eliminating harsh and aggressive actuations of vehicle control systems, and therefore, improves driver comfort. The method also enhances active safety performance with predictive vehicle controls, such as curve speed control, adaptive cruise control, lane keeping and lane changing/centering controls.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A recursive method for predicting dynamics of a vehicle moving on a road, the dynamics of the vehicle including a plurality of vehicle parameters provided by sensors on the vehicle, said method comprising:
    performing the following operations by a processor on the vehicle;
        generating a preview of a path to be followed by the vehicle, where the preview of the path is generated based on actual values of the plurality of vehicle parameters;
        obtaining predicted values of at least one of the plurality of vehicle parameters corresponding to the actual values of the at least one of the plurality of vehicle parameters, where the predicted values are obtained based on a target path to be followed by the vehicle on the road, wherein the target path is obtained based on a plurality of road parameters;
        obtaining a corrected value of at least one of the plurality of vehicle parameters corresponding to the actual values of each of the vehicle parameters, where the corrected value is obtained based on minimizing the difference between the previewed path and the target path to be followed by the vehicle on the road;
        predicting the dynamics of the vehicle based on the corrected values of the at least one of the plurality of vehicle parameters; and
        repeating the steps of generating the preview of the path, obtaining the corrected value of the at least one of the plurality of vehicle parameters and predicting the dynamics of the vehicle, wherein the steps are repeated after a pre-defined interval of time, and wherein the actual values of the at least one of the plurality of vehicle parameters is replaced by the predicted values of the at least one of the plurality of vehicle parameters.

2. The method according to claim 1 further comprising dividing a preview distance of the vehicle into a number of sampling segments, wherein the preview distance is a distance for which the steps are repeated, and wherein each of the sampling segments is located at the pre-defined interval of time.

3. The method according to claim 1 wherein generating preview of the path includes estimating the dynamics and kinematics of the vehicle.

4. The method according to claim 3 wherein estimating the dynamics of the vehicle includes estimating a value of the vehicle lateral velocity, and wherein the value of the vehicle lateral velocity is estimated using the actual values of the plurality of vehicle parameters.

5. The method according to claim 3 wherein the estimated kinematics of the vehicle are used to generate the preview of the path to be followed by the vehicle, and wherein the preview is generated by using the value of the vehicle lateral velocity.

6. The method according to claim 1 wherein the plurality of vehicle parameters is at least one of the group comprising vehicle speed, vehicle yaw rate and an input given to a steering wheel of the vehicle.

7. The method according to claim 1 wherein the actual values of the plurality of vehicle parameters are obtained using a sensing module.

8. The method according to claim 1 wherein the plurality of road parameters are obtained from at least one of the group comprising a global positioning system, a camera and a collection of maps.

9. The method according to claim 1 wherein the dynamics of the vehicle are predicted using a Luenberger state observer and a state integration function, and wherein the state integration function uses the predicted values of the at least one of the plurality of vehicle parameters.

10. The method according to claim 1 wherein repeating the steps of generating the preview of the path, obtaining the corrected value of the at least one of the plurality of vehicle parameters and predicting the dynamics of the vehicle after a predetermined time interval include the use of co-ordinate transform techniques.

11. A recursive method for predicting dynamics of a vehicle moving on a road, the dynamics of the vehicle including a plurality of vehicle parameters provided by sensors on the vehicle, the plurality of vehicle parameters including a vehicle speed, a vehicle yaw rate and an input given to a steering wheel of the vehicle, said method comprising:
performing the following operations by a processor on the vehicle;
generating a preview of a path to be followed by the vehicle on the road where the preview of the path is generated based on actual values of the vehicle speed, the vehicle yaw rate and the input given to a steering wheel of the vehicle;
obtaining a corrected value of at least one of the plurality of vehicle parameters corresponding to the actual values of each of the vehicle parameters, wherein the corrected value is obtained based on minimizing the difference between the previewed path and the target path to be followed by the vehicle on the road, wherein the target path is obtained based on a plurality of road parameters;
predicting the dynamics of the vehicle based on predicted values of the vehicle speed, the vehicle yaw rate and the input given to a steering wheel of the vehicle; and
repeating the steps of generating the preview of the path, obtaining the corrected value and predicting the dynamics of the vehicle for a predetermined time interval, wherein the steps are repeated after a pre-defined interval of time, and wherein the actual values of at least one of the vehicle speed, the vehicle yaw rate and the input given to the steering wheel of the vehicle is replaced by the predicted values of the vehicle speed, the vehicle yaw rate and the input given to the steering wheel of the vehicle.

12. The method according to claim 11 further comprising dividing a preview distance of the vehicle into a number of sampling segments, wherein the preview distance is a distance for which the method steps are repeated and wherein each of the sampling segments is located at the pre-defined interval of time.

13. The method according to claim 11 wherein generating a preview of the path includes estimating the dynamics and kinematics of the vehicle.

14. The method according to claim 13 wherein estimating the dynamics of the vehicle includes estimating a value of the vehicle lateral velocity, and wherein the value of the vehicle lateral velocity is estimated using the actual values for the vehicle speed, the vehicle yaw rate and the input given to a steering wheel of the vehicle.

15. The method according to claim 13 wherein the estimated kinematics of the vehicle are used to generate the preview of the path to be followed by the vehicle, and wherein the preview is generated by using the value of the vehicle lateral velocity.

16. The method according to claim 11 wherein the actual values of the vehicle speed, the vehicle yaw rate and the input given to the steering wheel of the vehicle are obtained using a sensing module.

17. The method according to claim 11 wherein the target path is obtained using at least one of the groups comprising a global positioning system, a camera and a collection of maps.

18. The method according to claim 11 wherein the dynamics of the vehicle are predicted using a Luenberger state observer and a state integration function, wherein the state integration function uses the predicted values of the at least one of the vehicle speed, the vehicle yaw rate and the input given to the steering wheel of the vehicle.

19. The method according to claim 11 wherein repeating the steps of generating the preview of the path, obtaining the predicted values and predicting the dynamics of the vehicle after a predetermined time interval includes the use of co-ordinate transform techniques.

20. A recursive method for predicting dynamics of a vehicle moving on a road, said dynamics of the vehicle including a plurality of vehicle parameters provided by sensors on the vehicle, said plurality of vehicle parameters including a vehicle speed, a vehicle yaw rate, an input for a steering wheel of the vehicle, said method comprising:
performing the following operations by a processor on the vehicle;
generating a preview of a path to be found by the vehicle on the road where the preview of the path is generated based on actual values of the vehicle speed, the vehicle yaw rate and the input for the steering wheel of the vehicle, wherein generating a preview of the path includes estimating the dynamics and kinematics of the vehicle including estimating a value of the vehicle lateral velocity using the actual values for the vehicle speed, the vehicle yaw rate and the input for the steering wheel of the vehicle, and wherein the estimated kinematics of the vehicle are used to generate the preview or the path to be found by the vehicle where the preview is generated by using the value of the vehicle lateral velocity;
obtaining predicted values of at least one of the vehicle speed, the vehicle yaw rate and the input for the steering wheel of the vehicle corresponding to the actual values of the vehicle speed, the vehicle yaw rate and the input for the steering wheel of the vehicle, wherein the predicted values are obtained based on a target path to be followed by the vehicle on the road, and wherein the target path is obtained based on a plurality of road parameters;
obtaining a corrected value of at least one of the plurality of vehicle parameters corresponding to the actual values of each of the vehicle parameters, wherein the corrected value is obtained based on minimizing the difference between the previewed path and the target path to be followed by the vehicle on the road;

predicting the dynamics of the vehicle based on the predicted values of the vehicle speed, the vehicle yaw rate and the input for the steering wheel of the vehicle;

dividing a preview distance of the vehicle into a number of sampling segments; and repeating the steps of generating the preview of the path, obtaining the corrected value and predicting the dynamics of the vehicle for a predetermined time interval, wherein the steps are repeated after a pre-defined interval of time, and wherein the actual values of at least one of the vehicle speed, the vehicle yaw rate and the input for the steering wheel of the vehicle is replaced by the predicted values of the vehicle speed, the vehicle yaw rate and the input for the steering wheel of the vehicle, and wherein the preview distance is a distance for which the method steps are repeated where each of the sampling segments is located at the pre-defined interval of time.

* * * * *